United States Patent
Baudoin et al.

(10) Patent No.: US 11,534,761 B2
(45) Date of Patent: Dec. 27, 2022

(54) ACOUSTIC TWEEZERS

(71) Applicants: UNIVERSITE DE LILLE, Lille (FR); ECOLE CENTRALE DE LILLE, Villeneuve d'Ascq (FR); CENTRE NATIONAL DE LA RECHERCHE SCIENTIFIQUE, Paris (FR); SORBONNE UNIVERSITE, Paris (FR)

(72) Inventors: Michaël Aymeric Cyril Baudoin, Lezennes (FR); Olivier Khalil Nizar Bou Matar-Lacaze, Valenciennes (FR); Antoine Jean-Pierre René Riaud, La Roche sur Yon (FR); Jean-Louis Pierre Thomas, Montgeron (FR)

(73) Assignees: UNIVERSITE DE LILLE, Lille (FR); ECOLE CENTRALE DE LILLE, Villeneuve d'Ascq (FR); CENTRE NATIONAL DE LA RECHERCHE SCIENTIFIQUE, Paris (FR); SORBONNE UNIVERSITE, Paris (FR)

( * ) Notice: Subject to any disclaimer, the term of this patent is extended or adjusted under 35 U.S.C. 154(b) by 439 days.

(21) Appl. No.: 16/757,160

(22) PCT Filed: Oct. 23, 2018

(86) PCT No.: PCT/EP2018/079053
§ 371 (c)(1),
(2) Date: Apr. 17, 2020

(87) PCT Pub. No.: WO2019/081521
PCT Pub. Date: May 2, 2019

(65) Prior Publication Data
US 2020/0338593 A1   Oct. 29, 2020

(30) Foreign Application Priority Data
Oct. 25, 2017   (EP) .................................. 17198204

(51) Int. Cl.
B06B 1/06 (2006.01)
B06B 3/04 (2006.01)
(Continued)

(52) U.S. Cl.
CPC ......... B01L 3/502761 (2013.01); B01L 99/00 (2013.01); B06B 1/0644 (2013.01);
(Continued)

(58) Field of Classification Search
None
See application file for complete search history.

(56) References Cited

U.S. PATENT DOCUMENTS
4,453,242 A   6/1984   Toda
6,359,367 B1  3/2002   Sumanaweera
(Continued)

FOREIGN PATENT DOCUMENTS
WO   2013/116311 A1   8/2013
WO   2014/178782 A1   11/2014
(Continued)

OTHER PUBLICATIONS

Riaud et al. (Selective Manipulation of Microscopic Particles with Precursor Swirling Rayleigh Waves) (Year: 2017).*
(Continued)

*Primary Examiner* — Curtis A Kuntz
*Assistant Examiner* — Jerold B Murphy
(74) *Attorney, Agent, or Firm* — Ronald M. Kachmarik; Cooper Legal Group LLC

(57) ABSTRACT

Electroacoustic device that includes a body, an electrode to be electrically powered, named hot electrode, and an elec-
(Continued)

Figure 1:
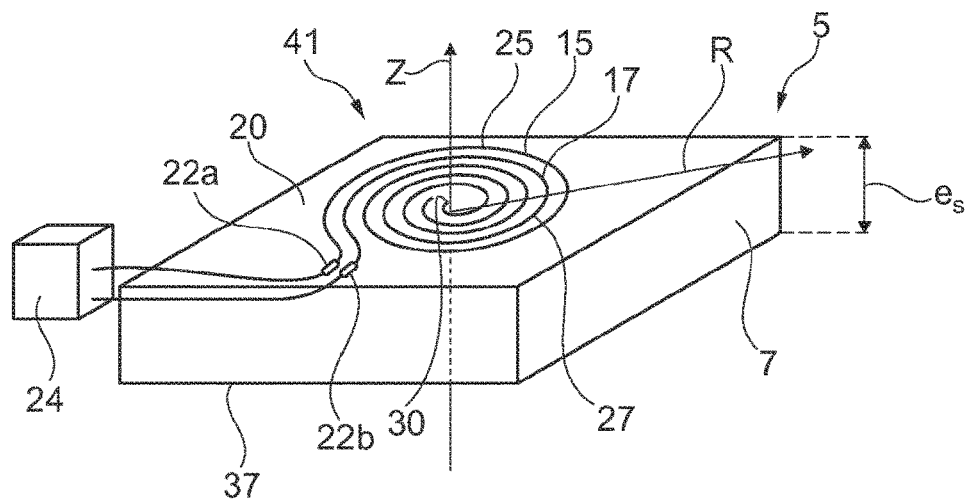

trode to be electrically grounded, named ground electrode. The body includes a piezoelectric part or the electroacoustic device further including a piezoelectric part different from the body. The hot electrode includes a hot track spiraling around a spiral axis. The radial step between two consecutive coils of the hot track decreasing radially from the spiral axis. The hot electrode and the ground electrode are arranged on the piezoelectric part such as to define a wave transducer configured to generate a focalised ultrasonic vortex propagating in the body and/or, when a fluid medium is acoustically coupled with the electroacoustic device, in the fluid medium.

24 Claims, 5 Drawing Sheets

(51) Int. Cl.
    *B01L 3/00*    (2006.01)
    *B01L 99/00*    (2010.01)

(52) U.S. Cl.
    CPC .......... *B06B 3/04* (2013.01); *B01L 2200/0652* (2013.01); *B01L 2300/0803* (2013.01); *B01L 2300/0832* (2013.01); *B01L 2400/0415* (2013.01); *B01L 2400/0436* (2013.01)

(56) References Cited

U.S. PATENT DOCUMENTS

| | | |
|---|---|---|
| 7,878,063 B1 | 2/2011 | Culer et al. |
| 2005/0266478 A1 | 12/2005 | Huang et al. |
| 2010/0219910 A1 | 9/2010 | Yamada et al. |
| 2012/0149126 A1 | 6/2012 | Wilson et al. |
| 2013/0047728 A1 | 2/2013 | Cochran et al. |
| 2013/0192958 A1 | 8/2013 | Ding et al. |
| 2020/0316586 A1* | 10/2020 | Riaud ............... G01N 29/2437 |

FOREIGN PATENT DOCUMENTS

| | | |
|---|---|---|
| WO | 2015/134831 A1 | 9/2015 |
| WO | 2017/157426 A1 | 9/2017 |

OTHER PUBLICATIONS

Riaud et al. (Synthesis of anisotropic swirling surface acoustic waves by inverse filter, towards integrated generators of acoustic vortices) (Year: 2015).*
Wang et al. (Particle manipulation with acoustic vortex beam induced by a brass plate with spiral shape structure) (Year: 2016).*
Jiang, et al. (Broadband and stable acoustic vortex emitter with multi-arm coiling slits) (Year: 2016).*
International Search Report corresponding International application PCT/EP2018/079053 dated Jan. 21, 2019, 4 pages.
Jiang Xue et al., "Broadband and stable acoustic vortex emitter with multi-arm coiling slits", Applied Physics Letters, A I P Publishing LLC, US, vol. 108, No. 20, May 16, 2016, XP012207741.
Antoine Riaud et al., "Selective manipulation of microscopic particles with precursor swirling rayleigh waves", Physical Review Applied, vol. 7, No. 2, Feb. 1, 2017, XP055460102.
Wang Tian et al., "Particle manipulation with acoustic vortex beam induced by a brass plate with spiral shape structure", Applied Physics Letters, A I P Publishing LLC, US, vol. 109, No. 12, Sep. 19, 2016, XP012212106.
Martyn Hill, "A One-Sided View of Acoustic Traps", Physics, vol. 9, Jan. 1, 2016, XP055460139.
Antoine Riaud et al., Synthesis of anisotropic swirling surface waves by inverse filter towards integrated generators of acoustical vortices, Arxiv.org, e-print archive, physics, Apr. 30, 2015, 06878, https://arxiv.org/pdf/1504.06878.pdf.
Antoine Riaud et al, A nisotropic swirling surface acoustic waves from inverse filtering for on-chip generation of acoustic vortices, Physical Review Applied, Sep. 15, 2015, vol. 4, No. 3, 034004 (p. 1-10).

* cited by examiner

ACOUSTIC TWEEZERS

The present invention relates to an electroacoustic device notably for manipulating objects which size is less than $10^{-2}$ m, immersed in a fluid, notably liquid medium and in particular being denser and/or more rigid than the fluid, notably liquid medium.

The selective manipulation of nano-sized and micro-sized objects is a complex operation in various technical domains, such as cellular biology, microfluidic, nano- and micro-sized system assembly. Manipulation might be performed using a tool, for instance tweezers or a micropipette. The object is then manipulated through displacement of the tool. Such a manipulating method, which is generally named "direct contact" method, is not desirable, in particular when the object is soft, or tacky, or even brittle. Furthermore, it may alter the manipulated object. Last, the introduction of the tool in a system wherein the object is located may modify the properties of the system. For instance in case the object is submitted to an electromagnetic field, introducing the tool might create a disturbance of said field. It can also introduce some pollution. In case the system is a biological medium comprising cells, the cell behavior can be modified by the introduction of the tool.

Alternative contactless methods have been developed, such as dielectrophoresis, magnetophoresis, or optophoresis, also named "optical tweezers" method. However, all these techniques have major drawbacks. For instance, dielectrophoresis depends on the object polarizability and requires installing electrodes in the vicinity of the object to be manipulated. Magnetophoresis requires grafting of markers onto the object. Optophoresis may be used with or without grafting but is limited to very small forces by the significant heating and photo-toxicity inherent of this method.

Acoustophoresis is another method known for manipulating objects. The article "*Selective Manipulation of Microscopic Particles with Precursor Swirling Rayleigh Waves*", Antoine Riaud et al., Phys. Rev. Applied 7, 024007, describes a wave transducer comprising electrodes having tracks of opposite polarity provided on a piezoelectric material and spiraling around a spiral axis perpendicular to a face of the piezoelectric material. A glass support is acoustically coupled, by means of silicon oil, to the piezoelectric material on one of its face, and a liquid medium comprising an object to be manipulated is provided on top of the opposite face. The electrodes are designed in such a way that the wave transducer generates a swirling surface acoustic wave (also named Swirling SAW) that propagates along the surface of the piezoelectric material and transmits into the bulk of the glass substrate wherein it degenerates and propagates as an acoustic vortex or a pseudo acoustic vortex. Said vortex is transmitted into the liquid medium wherein it generates locally a zone of lowest acoustic intensity wherein the object is entrapped. By displacing the glass support relatively to the wave transducer, the object can be manipulated.

However, the device and methods described Riaud et al. present the following major drawbacks. Firstly, they do not allow an easy manipulation of the object in a direction parallel to the spiral axis, since the acoustic intensity gradient is low in this direction as compared to the acoustic intensity gradient of the vortex in a transverse plane. Secondly, in addition to the low intensity region at the center of the vortex, the generated Swirling SAW induces zones of local low acoustic intensity in the piezoelectric support, which are such that objects others than the one to be manipulated can sometimes be entrapped in the resulting local zones of low acoustic intensity in the fluid called secondary rings. Thirdly, as the Swirling SAW propagates in the surface of the piezoelectric material which is anisotropic, in a plane transverse to the spiral axis, the pressure is anisotropically distributed, which leads to anisotropic trapping force.

3D acoustic trapping has been taught in Baresh et al., Phys. Rev. Lett., 116:024301, 2016, but the device to perform such 3D trapping comprises a transducer network, which is costly and complex to implement.

Therefore, there is a need for an electroacoustic device and for a method for manipulating at least one object that overcome at least some of the drawbacks of the techniques of the prior art.

The invention aims at fulfilling these needs and relates to an electroacoustic device comprising a body, an electrode to be electrically powered, named hot electrode, and an electrode to be electrically grounded, named ground electrode, the body comprising a piezoelectric part or the electroacoustic device further comprising a piezoelectric part different from the body,
the hot electrode comprising a hot track spiraling around a spiral axis (X), the distance between two consecutive coils of the hot track decreasing radially from the spiral axis, the hot electrode and the ground electrode being arranged on the piezoelectric part such as to define a wave transducer configured to generate a focalised ultrasonic vortex propagating in the body and/or, when a fluid medium is acoustically coupled with the electroacoustic device, in said fluid medium.

As compared to the device taught in Riaud et al., the electroacoustic device according to the invention is notably configured to generate a focalized acoustic vortex. Preferably, the focalized acoustic vortex does not comprise any component of a surface acoustic wave propagating in the piezoelectric part. The electroacoustic device according to the invention is such that the focalized acoustic vortex it is adapted to generate, comprises less secondary rings than the acoustic vortex or pseudo acoustic vortex generated by the device of Riaud et al. Furthermore, when an object is entrapped in the zone of lowest acoustic intensity of the focalized acoustic vortex, it can be manipulated along a direction parallel to the spiral axis. Last, considering the same object to be manipulated, the force applied to the object by implementing the electroacoustic device of the invention can be greater than with Riaud's device, for instance at least 5 times, or even 10 times greater. Last, as it will appear more clearly in the following, in some specific embodiment, in a plane transverse to the spiral axis, the pressure is anisotropically distributed.

Furthermore, compared to the device of Baresh et al., the electroacoustic device according to the invention is easy to implement, since in an embodiment, it can be implemented with a single hot electrode and a single ground electrode.

The wave transducer can be configured to generate a focalized acoustic vortex being such that when a fluid, preferably liquid, medium is acoustically coupled with the body, notably superimposed over the body, the fundamental wavelength in the fluid medium ranges preferably between 100 nm and 10 mm.

Preferably, the fluid medium is a liquid medium.

The wave transducer is preferably configured for the body is located in between the hot electrode and a focal locus of the focalised ultrasonic vortex.

The piezoelectric part preferably comprises more than 50%, preferably more than 90%, even preferably consists in a piezoelectric material chosen among lithium niobiate, lithium titanate, quartz, zinc oxide, aluminum nitride, lead titano-zircanate and their mixtures, as a percentage by weight on the basis of the weight of the piezoelectric part.

Figure 12:
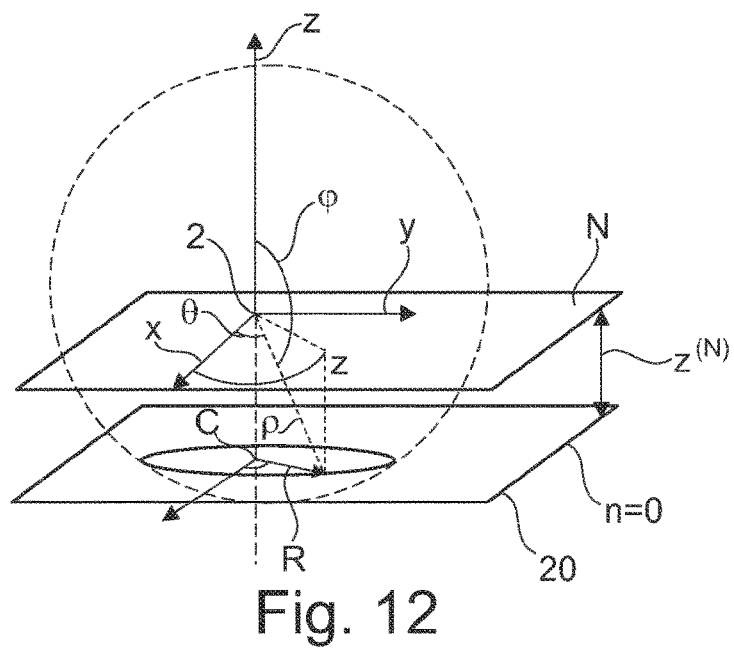
Figure 13:
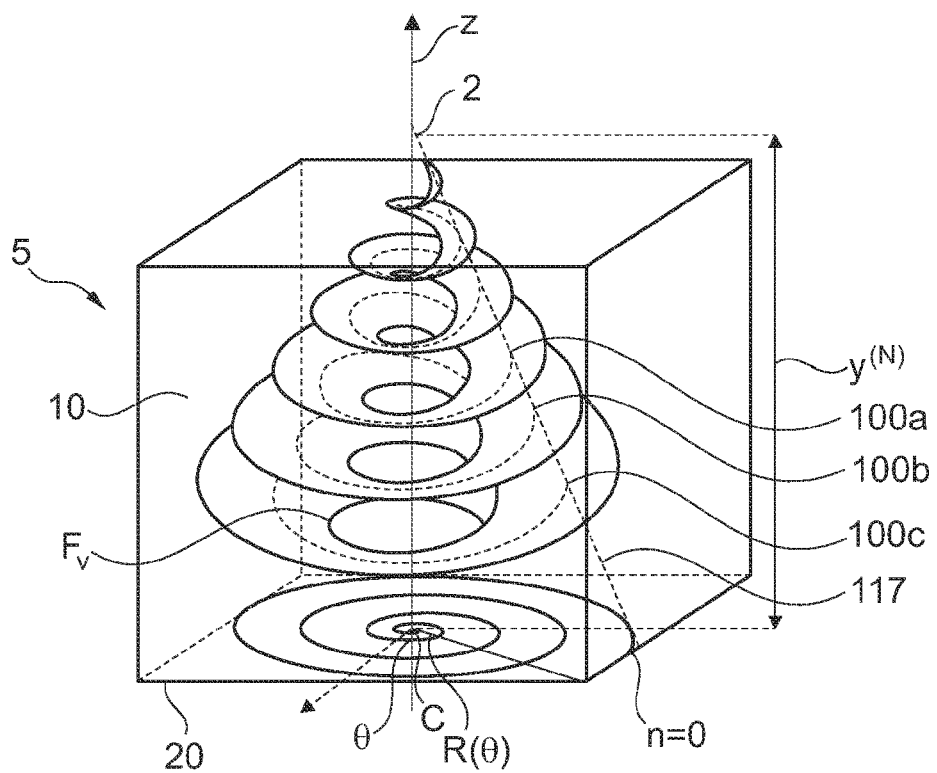

Preferably, the hot track draws a line along a polar coordinate R(θ), as illustrated on FIGS. 12 and 13, from a center C, said polar coordinate being obtained by solving the equation (i)

$$\psi_0 = \mu^{(N)}(\overline{\psi} + \pi, -\overline{\sigma}_N) - \alpha(\overline{\psi} + \pi, -\overline{\sigma}_N) + \omega s_{ref} h(\theta, \varphi, \overline{\psi}, \overline{\sigma}_N)\sqrt{R^2 + z^{(N)^2}} + \frac{\pi}{4}\zeta \quad \text{(i)}$$

wherein $$\tan \varphi = -\frac{R}{z^{(N)}}, \quad \text{(ii)}$$

with $z^{(N)}$ being the distance along axis Z between the face of the piezoelectric part on which the hot track is provided and the focal locus 2 of the vortex as illustrated on FIG. 12, $\psi_0^{(R)}$ is the phase of the electric potential coupled to the vortex by piezoelectric effect at height along axis Z on the plane where the hot track is provided; equation (i) is solved when this phase is constant along an electrode, $\mu^{(N)}(\overline{\psi}+\pi,-\overline{\sigma}_N)$ is the phase of the angular spectrum at the focal locus of the vortex with $\overline{\psi}$ and $\overline{\sigma}_N$ being beam stirring angles, preferably $\mu^{(N)}=-m\overline{\psi}$, with m being a positive integer number, $\alpha(\overline{\psi}+\pi,-\overline{\sigma}_N)$ is the piezoelectric coupling coefficient, ω is the wave pulsation of the vortex, $S_{ref}$ is a reference speed, for instance equal to the average sound speed in the piezoelectric part, $h(\theta,\varphi,\psi,\sigma_N)$ is the dimensionless fly time of the wave, which reads $$h = \frac{1}{s_{ref}}\left(S_r(\psi, \sigma_0(\sigma_N))\sin\varphi\cos(\psi - \theta) + \cos\varphi \sum_{n=0}^{N-1} s_z^{(n)}(\psi, \sigma_n(\sigma_N))\gamma_n^{n+1}\right) \quad \text{(iii)}$$

where $$\gamma_n^{n+1} = \frac{z^{(n+1)} - z^{(n)}}{z^{(N)}},$$

with $z^{(n)}$ being the distance between the first interface of a material n stacked onto the piezoelectric part and the plane containing the hot track, in case n medium are stacked onto the piezoelectric part, n=0 corresponding to the plane containing the hot track, $s_r(\psi,\sigma_0(\sigma_N))$ and $s_z^{(n)}(\psi,\sigma_n(\sigma_N))$ being the components of the wave slowness vector in the cylindrical coordinate system with the propagation direction being referred by angles ψ and σ; $s_r(\psi,\sigma_0(\sigma_N))$ is independent of the material due to propagation laws, and is for instance chosen as being equal to $s_r^{(0)}(\psi,\sigma_0(\sigma_N))$ which is the radial component of the wave slowness in the piezoelectric part; each wave, which forms the vortex by interference of multiples waves, propagates in medium n along a direction expressed with angles ψ and $\sigma_n$ being the azimuthal and inclination angles respectively from axis Z measured from the focal locus of the vortex, and $\sigma_0$ being the refraction angle of the material constitutive of the piezoelectric part; Angle ψ is independent from the material wherein the wave propagates while the refraction angle $\sigma_n$ is obtained by solving the Snell-Descartes relationship $$s^{(n)}(\psi,\sigma_n)\sin\sigma_n = s^{(N)}(\psi,\sigma_N)\sin\sigma_N, \quad \text{(iv);}$$

a man skilled in the art knows how to compute the slownesses from the material's properties for any kind of wave using solid acoustics methods well known in the art;

$s_z^{(n)}$ is given by the following dispersion relationship $$s_z^{(n)}(\psi,\sigma_n) = \sqrt{s^{(n)}(\psi,\sigma_n)^2 - s_r(\psi,\sigma_0(\sigma_N))^2} \quad \text{(v), and}$$

$$\frac{\pi}{4}\zeta$$

is the Gouy phase of the vortex, wherein ζ is the signature, i.e. the difference between the number of positive eigenvalues and the number of negative eigenvalues of the Hessian matrix A of function h evaluated at $\overline{\psi}, \overline{\sigma}_N$ $$A = \begin{pmatrix} \frac{1}{\sin^2\sigma_N}\frac{\partial^2}{\partial\psi^2}h & \frac{1}{\sin\sigma_N}\frac{\partial^2}{\partial\psi\partial\sigma}h \\ \frac{1}{\sin\sigma_N}\frac{\partial^2}{\partial\psi\partial\sigma}h & \frac{\partial^2}{\partial\sigma^2}h \end{pmatrix}\bigg|_{\overline{\psi},\overline{\sigma}_N} \quad \text{(vi)}$$

To solve equation (i), once the 4 variable function $h(\theta,\varphi,\psi,\sigma_N)$ is obtained, the beam stirring angles $\overline{\psi}, \overline{\sigma}_N$ are obtained, using numerical well known methods, as solutions of the following differential equation systems $$\begin{cases} \dfrac{\partial}{\partial\sigma_N}h = 0, \\ \dfrac{1}{\sin\sigma_N}\dfrac{\partial}{\partial\psi}h = 0. \end{cases} \quad \text{(vii)}$$

In an embodiment, the electroacoustic device comprises a stack comprising in succession the piezoelectric part, the body and optionally at least one substrate stacked onto the body. In another embodiment, the electroacoustic device comprises a stack comprising the body and optionally at least one substrate stacked onto the body. In order to define the shape of the hot track by resolving the system of equations (i) to (viii), the following method can be implemented, comprising the successive steps of:

computing the slowness in each material of the stack, by standard methods well known by a skilled worker, i.e. the piezoelectric part and/or the body and/or the substrate(s), computing the refraction angles $\sigma_n$ as solutions of equation (iv) and the z-component of the wave slowness vector in each constituent (n) of the stack as solution of equation (v), computing the function h as solution of equation (iii), computing $\overline{\psi}, \overline{\sigma}_N$ as solutions of equation (vii), evaluating the Gouy phase as solution of equation (vi),
computing function $\psi_0(R)$ and
evaluating $R(\theta)$.

In equation (i), every leap of $2\pi$ in angle $\psi_0$ yields a line of a new hot track having the same polarity. The inverse polarity is provided with a leap of $\pi$.

In an embodiment, for instance, the stack consists of a piezoelectric part and a body, the body being thicker, preferably 5 times thicker, than the piezoelectric part, and made of a an isotropic material, and the hot track draws a line along a polar coordinate $R(\theta)$, from a center C which equation is $$R(\theta) = \sqrt{\left(\frac{\psi_0 + m\theta}{\omega s}\right)^2 - z^{(N)^2}} \quad \text{(viii)}$$

Equation (viii) is obtained as an analytic solution of the sets of equations (i) to (vii) with $s_r(\psi, \sigma) = s \sin \sigma$ and $s_z(\psi, \sigma) = s \cos \sigma$, s being the slowness of the vortex in the body material and a being a constant having no influence on $\psi_0(R)$. In such case, solving equation (vi) yields $\overline{\psi} = \theta$ and $\overline{\sigma} = \varphi$. Further, $h(\overline{\psi}, \overline{\sigma}) = 1$ and A is identity matrix, the Gouy phase being $\pi/2$ and can be discarded since it is a constant that has no influence on the level set $\psi_o(R)$. In other words, in equation (viii), $\psi_0$ is a constant.

The hot electrode preferably comprises a radially inner coil surrounding entirely the spiral axis, and defines a central zone;

The hot track preferably runs along at least one coil, preferably along at least 5 coils, even preferably along 15 coils. Increasing the number of coils improves the focalization and increases the trapping force.

The hot electrode can comprise a hot power terminal to which the hot track is electrically connected.

In a variant, the ground electrode can comprise a radially inner coil surrounding entirely the spiral axis, and define a central zone.

The ground track can run along at least one coil, preferably along at least 5 coils, even preferably along 15 coils.

Preferably, the ground track and the hot track both comprise the same number of coils.

The ground electrode preferably comprises a ground power terminal to which the ground track is electrically connected.

The ground electrode can comprise at least one ground track spiraling around the spiral axis.

In a variant, the ground track can be provided on the face of the piezoelectric part wherein the hot track is provided.

The ground electrode and/or the hot track can be coated with an electrically isolating material, preferably in the form of a quarter wavelength layer. A quarter wavelength layer enhances the transmission of the acoustic wave.

Preferably, the electroacoustic device comprises a plurality of at least N hot electrodes, with N being at least 2, preferably at least 4, and at least one, preferably all hot electrodes of the plurality comprising a hot track spiraling around the spiral axis (X). In particular, the ground track can be provided between two adjacent hot tracks. In other words, the ground track and two adjacent hot tracks can be intertwined. The N hot tracks can be intertwined the ones with the others.

In some embodiment, the ground electrode can comprise at least M ground tracks, with M being at least 2, preferably at least 4, preferably M being equal to N, each ground track defining at least one spiral coil, the radial distance between two adjacent coils of two adjacent ground tracks decreasing from the spiral axis. The M ground tracks can be intertwined the ones with the others.

In some embodiments, the ground tracks and the hot tracks define a pattern of intertwined ground tracks and hot tracks alternating the one with the others, and provided on one face of the piezoelectric part, and optionally on the opposite face of the piezoelectric part. The ground tracks can be intertwined with the hot tracks.

In some embodiment, the width of the hot track can radially vary from the center. The amplitude of the focalized ultrasonic vortex can thus be modified. Notably, along a radial direction, the width of a radially inner coil can be greater than the width of a adjacent radially outer coil.

Preferably, the electroacoustic device can further comprise a control unit for electrically powering the hot electrodes and being configured for controlling each electrode pair consisting of a hot electrode and the ground electrode, such that said each pair generates a volume acoustic wave, preferably having a fundamental frequency ranging between 100 KHz and 10 GHz, in the piezoelectric part, the phase shift between the volume acoustic waves generated by two adjacent electrodes pairs being of 2n/N. Preferably, the hot terminal and ground terminal are electrically connected to the control unit.

In some preferred embodiment, at least two hot electrodes each can comprise a single hot track defining at least one spiral coil, the radial distance between two adjacent coils of the two respective adjacent hot tracks decreasing from the spiral axis.

Two adjacent hot tracks can be provided on the same face of the piezoelectric part.

The hot and ground electrodes are preferably deposited onto the piezoelectric part by photolithography; in particular, a layer of a material comprising chromium or titanium might be deposited onto the piezoelectric part before depositing the hot and ground electrodes in order to improve the adherence of the electrodes on the piezoelectric part.

The hot and ground electrodes can be made from a metallic material, preferably chosen among gold, silver, aluminum, chromium, titanium and their mixtures; aluminum is preferred for applications at frequency higher than 100 MHz; gold and/or silver are preferred when a good conductivity is required;

Furthermore, the electroacoustic device can comprise a base, preferably made of a non-piezoelectric material, provided on the body. The base can be made at least partially of a non-opaque, preferably a transparent material, notably made of glass. The base can have the form of a plate having a thickness ranging between 10 µm and 1 cm, preferably ranging between 100 µm and 1 mm, for instance equal to 150 µm.

The base can be part of an objective of a microscope or can be part of a device configured to be fixed to an objective of a microscope.

The electroacoustic device is not limited to comprise a single wave transducer. In particular, it can comprise a plurality of wave transducers configured for generating focalized ultrasonic vortices of different fundamental wavelengths in the body. The electroacoustic device can notably comprise a visual marking located in the central zone of the wave transducer.

In some embodiment, the electroacoustic device can be disk shaped. Notably, the base can be mounted rotatable on a pivot, and can be adapted to rotate relatively to the body around a rotation axis. Furthermore, the electroacoustic device can comprise an organ configured for displacing the base relatively to the wave transducer, preferably by translation along anyone of two transverse axis.

The electroacoustic device further can comprise first and second wave transducers, the location of the center of the first wave transducer in a first arrangement of the device corresponding to the location of the center of the second wave transducer in a second arrangement of the device, the device being preferably configured such that the transition from the first to the second arrangement be operated by rotation around a pivot.

The electroacoustic device can comprise a contact brush for connecting the hot electrodes to a control unit. The electroacoustic device can comprise first and second wave transducers, the contact brushes being in contact and with the hot electrode of the respective first and second wave transducers, in respective first and second arrangements of the device, the device being preferably configured such that the transition from the first to the second arrangement be operated by rotation around a pivot.

According to a preferred first specific embodiment, the electroacoustic device is such that the piezoelectric part is different from the body, the body being arranged on a face of the wave transducer and is acoustically coupled with the wave transducer.

The body is preferably made at least partially of a non-opaque and preferably transparent material. Preferably, the body is made of a non-piezoelectric material. In particular, the body can be made of an isotropic material with respect to the propagation of an ultrasonic wave. It can overlap completely the wave transducer.

Preferably, the body comprises a material chosen among a glass, notably borosilicate glass, and a polymer, notably a thermoplastic, preferably polymethylmethacrylate (PMMA). More preferably, the body comprises glass.

The body thickness is preferably at least 1 time and at most 5 times, notably 3 times the wavelength of the focalized vortex in the body.

Preferably, the body thickness ranges between 10 μm and 1 cm.

The piezoelectric part and the body can be acoustically coupled, for instance by means of a glue, notably in the shape of a layer provided in between the piezoelectric part and the body.

At least one hot electrode can be sandwiched in between the piezoelectric part and the body.

As for the thickness of the electroacoustic part of the first preferred embodiment, it is preferably less than or equal to $(2p+1)\lambda/2$, with $\lambda$ being the fundamental wavelength of the acoustic volume wave generated by one electrode pair, p being an integer less than or equal to 5; preferably, the thickness of the electroacoustic part ranges between 100 nm and 1 cm, preferably between 1 μm and 100 μm.

Further, the wave transducer can be covered by a protective coating, preferably comprising silica.

In a variant, the piezoelectric part preferably comprises a recess, preferably a groove spiraling around the spiral axis Z provided in between the gap between the hot tracks of two adjacent hot electrodes. The recess limits the development of a diaphonic wave that propagates transversally in the piezoelectric part.

As for the disposition of the hot electrode and ground electrode in the first preferred embodiment, the hot track can be provided in between the piezoelectric part and the body. In a variant, the device can comprise a plurality of hot electrodes and at least half, notably all of the plurality of hot electrodes can be provided in between the piezoelectric part and the body.

Two adjacent hot tracks can be provided on two opposite faces of the piezoelectric part. In a variant, two adjacent hot tracks can be provided on the same face of the piezoelectric part.

As for the ground electrode, it can comprise a ground track spiraling around the axis Z which can be provided on the face of the piezoelectric part opposite to the face wherein the hot track is provided. Preferably the ground track is superimposed with the hot track it faces and vice-versa.

As an alternative, the ground electrode can comprise a ground coating extending over a face of the piezoelectric part and being superimposed, preferably completely, with the hot track of each hot electrode of the plurality of N hot electrodes. A ground coating can easily be deposited on the piezoelectric part at low cost.

In case the ground electrode comprises a plurality of ground tracks, each ground track of the plurality of ground tracks can be completely superimposed with the hot track of a respective hot electrode of the plurality of hot electrodes, and vice-versa. Each ground track of the plurality of ground tracks can face a hot track of a respective hot electrode of the plurality of hot electrodes, and vice-versa.

A pattern of hot tracks disposed on one face of the piezoelectric part can be superimposed on a pattern disposed on the opposite face, and vice-versa.

According to a preferred second specific embodiment, the electroacoustic device can be such that the body comprises, preferably consists in, the piezoelectric part, the hot electrode and the ground electrode comprising respective hot track and ground track provided on a same face of the body, both the hot track and ground track spiraling around the spiral axis Z. Preferably, the radial distance between a coil of the hot track adjacent to a coil of the hot electrode decreases from the spiral axis.

Preferably, according to the preferred second embodiment, the body thickness ranges is preferably at least 1 time and preferably at most 5 times, notably equal to 3 times the wavelength of the focalized vortex in the body. Preferably, it ranges between 10 μm and 1 cm. The electroacoustic device can comprise a base, the body being interposed between the hot electrode and the ground electrode on the one hand, and the base on the other hand.

The electroacoustic device according to the invention can comprise the fluid medium, preferably overlapping the precursor transducer. In particular, the fluid medium can be a liquid.

The fluid medium can comprise, or even consist in a solvent wherein at least one object can be embedded. For instance, the solvent is water. For instance, the object is chosen among a particle, a droplet, a bubble, another fluid medium being different from the fluid medium, a drug capsule and a biological sample, for example a cell, a microorganism, an organelle, said object being embedded in the fluid medium.

In an embodiment, the electroacoustic device can comprise a support to which the wave transducer is attached. The support can comprise a handle adapted to be gripped by a hand of a user or by a robotic arm. For instance, the electroacoustic device is in the form of a pen. In a variant, the support comprises a stage and a base, the stage being adapted to move along at least one, for example two, preferably three, preferably perpendicular, directions relative to the base. The displacement of the stage can be actuated by means of a motor or manually.

Furthermore, the invention relates to a method for manipulating a fluid, preferably liquid, medium or at least one object preferably chosen among a particle, a droplet, a bubble, another fluid medium being different from the fluid medium, a drug capsule and a biological sample, for example a cell, a microorganism, an organelle, said object being embedded in the fluid medium, the method comprising the successive steps consisting in:

generating a focalized ultrasonic vortex with the electroacoustic device according to the invention, positioning the fluid medium such that the focal locus of the focalized ultrasonic vortex is provided in the bulk of the fluid medium, such as to generate an acoustic trap or an acoustic streaming to which the object is submitted, and optionally, manipulating the object through displacement of the wave transducer of the electroacoustic device relative to the fluid medium.

Last, the invention also relates to the use of the electroacoustic device of the invention for generating a focalized ultrasonic vortex. The focalized ultrasonic vortex can be isotropic or anisotropic. In particular, it can be spherical.

For instance, a "spherical vortex" propagating in an "isotropic medium" is defined through equation (ix):

$$W_n^m(\theta,\varphi,\rho)=e^{-i\omega t}j_n(k\rho)Y_n^m(\varphi,\theta), \quad (ix),$$

and a "spherical vortex" propagating in an "anisotropic medium" is defined through equation (x):

$$W_n^m(\theta, \varphi, \rho) = \frac{e^{-i\omega t}}{4\pi i^n} \int_{\sigma=0}^{\pi} \int_{\psi=-\pi}^{\pi} Y_n^m(\sigma, \psi)e^{i\vec{k}\cdot\vec{\rho}}\sin\sigma \, d\sigma d\psi, \quad (x)$$

where:

($\theta,\varphi,\rho$) are spherical coordinates in the Cartesian coordinate system (x,y,z) as shown on FIG. 12, $\theta$ being the azimuthal angle and $\varphi$ the inclination angle from axis z and $\rho$ a radius along azimuthal angle $\theta$ and inclination angle $\varphi$ from the focal locus of the vortex, $\sigma$ and $\psi$ are the analogs of $\varphi$ and $\theta$ respectively for the propagation of the vortex in the reciprocal space, $$Y_n^m(\varphi, \theta) = \sqrt{\frac{(2n+1)}{4\pi}\frac{(n-m)!}{(n+m)!}} P_n^m(\cos\varphi)e^{im\theta}$$

is the spherical harmonic of degree n and order m, and $j_n$ is the spherical Bessel function of order n and $P_n^m$ is the associated Legendre polynomial.

An "ultrasonic" wave has a frequency ranging between 1 MHz and 10000 MHz.

A "radial" direction is perpendicular to the spiral axis.

A "radial" plane comprises both the spiral axis and one radial direction.

A "transverse" plane is perpendicular to the spiral axis.

A "radially inner" part is closer to the spiral axis than a "radially outer" part along a radial direction.

A "coil" of a spiral is a part of a spiral which extends angularly around the spiral axis of an angle of at least 360°.

The "thickness" of a part is measured along a direction parallel to the spiral axis.

The "radial step" between two coils corresponds to the radial distance, measured between two points both located at a mid-width of two adjacent coils.

Among a plurality of tracks possibly provided on both faces of a piezoelectric part, when observed projected along the spiral axis a transverse cross section of the piezoelectric part, a second track "adjacent" to a first track is the track which radial distance from the first track is the lowest. The same goes with a coil of a spiral or an electrode. According to this definition, a first track provided on a face of the piezoelectric part can be adjacent to a second track provided on the opposite face of the piezoelectric part.

Figure 2:
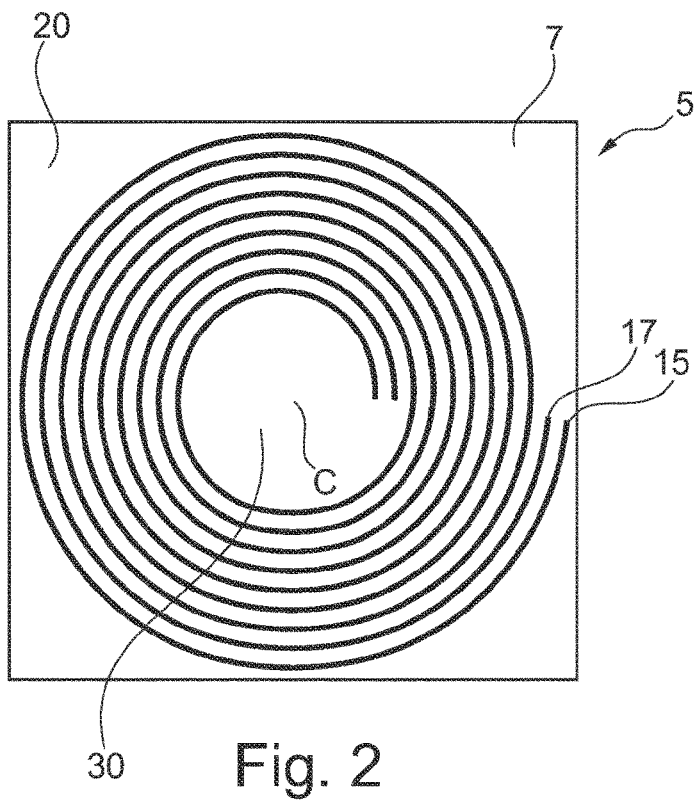
Figure 3:
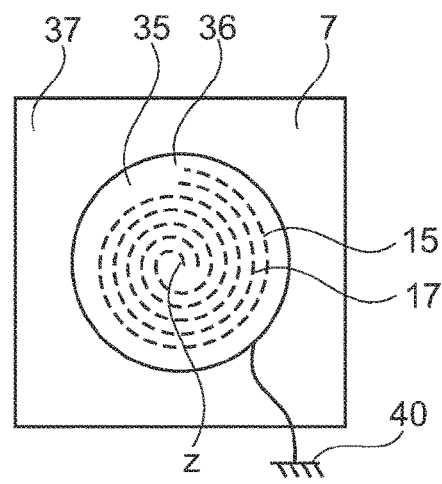
Figure 4:
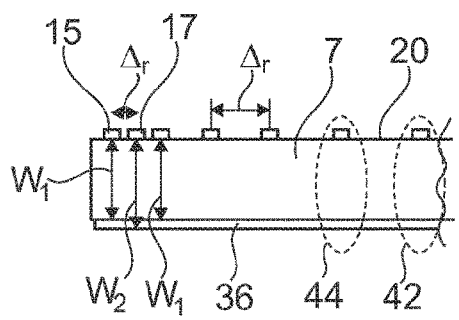
Figure 5:
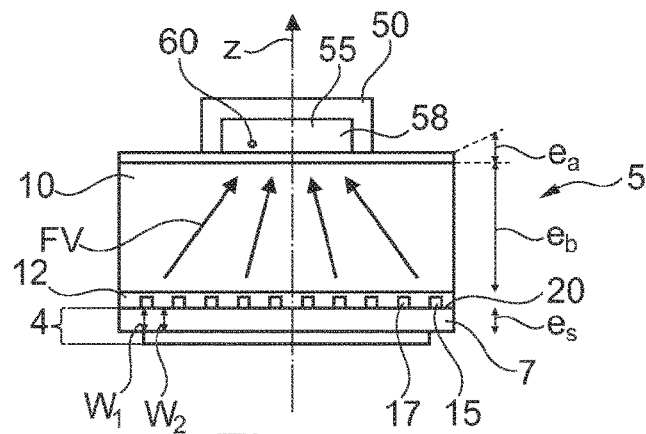
Figure 6:
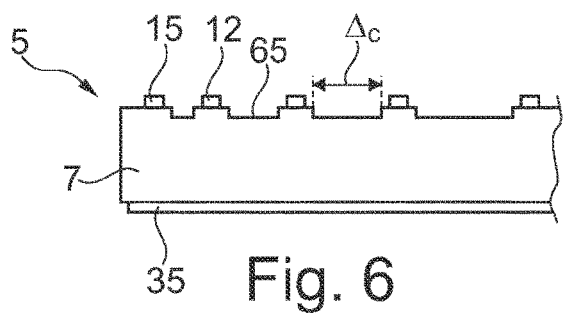
Figure 7:
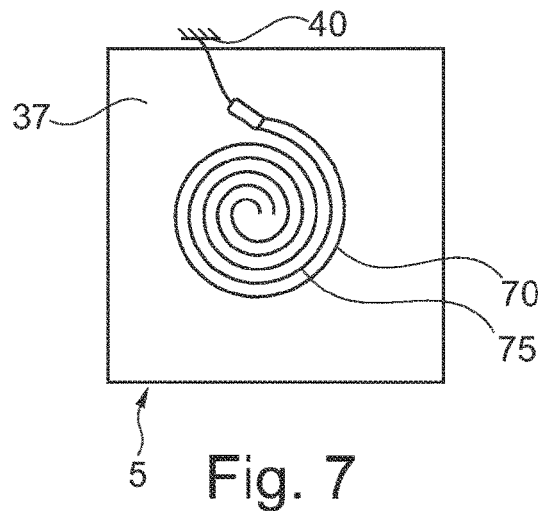
Figure 8:
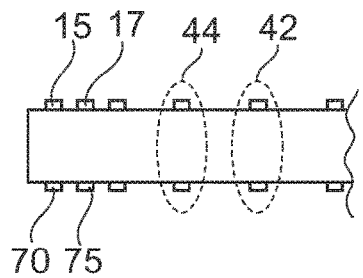
Figure 9:
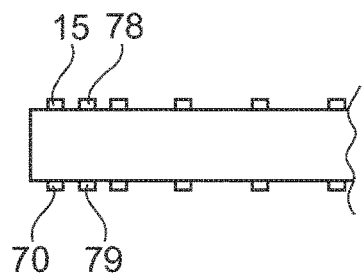
Figure 10:
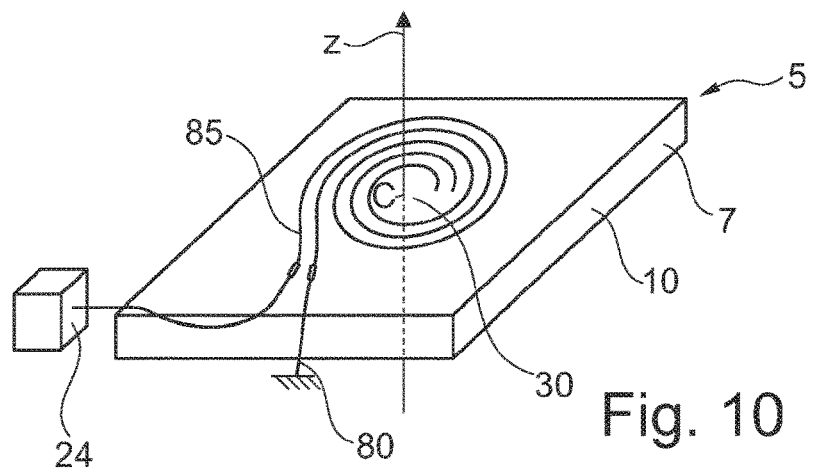
Figure 11:
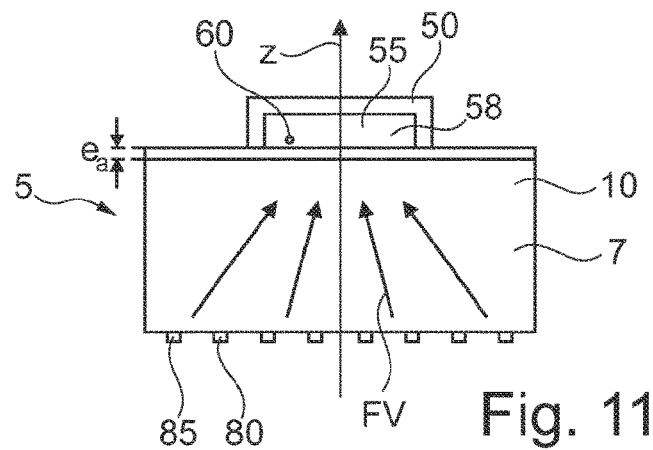
Figure 14:
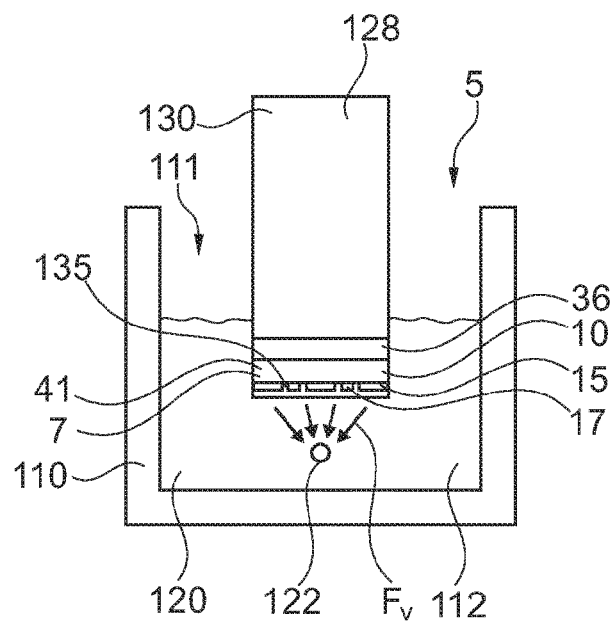
Figure 15:
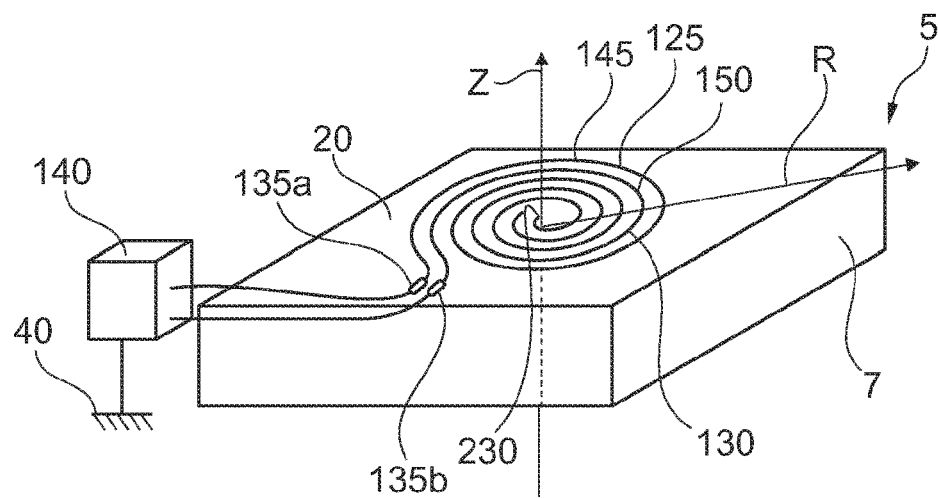
Figure 16:
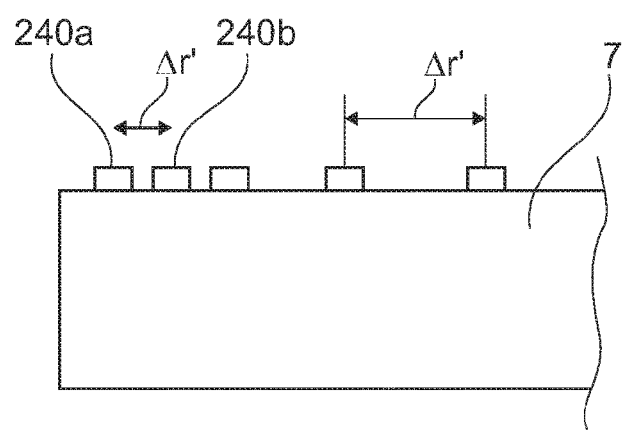

The invention may be better understood from a reading of the detailed description that follows, with reference to exemplary and non-limiting embodiments thereof, and by the examination of the appended drawing, in which:

FIG. 1 illustrates, from a perspective view, an electroacoustic device according to a first embodiment of the invention;

FIGS. 2 and 3 illustrate views along the spiral axis of a face of the wave transducer of the electroacoustic device of FIG. 1 and its opposite face respectively, FIG. 4 illustrates a side view of an axial cross section of the electroacoustic device of FIG. 1, FIG. 5 illustrates a side view of an axial cross section of the electroacoustic device of FIG. 1 implemented for manipulating an object, FIG. 6 illustrates a side view of an axial cross section of a variant of the electroacoustic device of FIG. 1, FIGS. 7 and 8 illustrate respectively a face view and a side view of an axial cross section of a variant of the electroacoustic device of FIG. 1, FIG. 9 illustrates a side view of an axial cross section of another variant of the device of FIG. 1, FIG. 10 illustrates from a perspective view an electroacoustic device according to a second embodiment of the invention, FIG. 11 illustrates a side view of an axial cross section of the electroacoustic device of FIG. 10 for manipulating an object, FIG. 12 illustrates the definition of reference points for expressing equations (i) to (x), FIG. 13 illustrates a method implemented to define the specific shape of the hot electrode for generating a focalized ultrasonic wave, FIG. 14 illustrates a side view of an axial cross section of another example of electroacoustic device according to the invention, FIG. 15 illustrates, from a perspective view, another example of the electroacoustic device according to the invention, and FIG. 16 illustrates a side view of an axial cross section of the electroacoustic device of FIG. 15.

In the drawing, the respective proportions and sizes of the different elements are not always respected for sake of clarity.

FIGS. 1 to 5 illustrate a first embodiment of the electroacoustic device 5.

The electroacoustic device according to FIGS. 1 to 5 comprises a piezoelectric part 7 in the shape of a plate of thickness $e_s$ equal to 120 μm, presenting an upper face and a lower face. It is made of a LiBNO$_3$ Y-cut at 35°.

The electroacoustic device also comprises a body 10, represented on FIG. 5, made of borosilicate glass, having a thickness $e_b$ of 6.5 mm. The body is acoustically coupled to the piezoelectric part by means of a coupling media 12, for instance optical adhesive NOA61 of Norland Product.

Two hot first 15 and second 17 electrodes are provided on the upper face 20, and each comprise a contact brush 22a-b for connecting the hot electrodes to a control unit 24 which provides electrical power to the first and second electrodes. The first, respectively the second hot electrode comprise a first 25, respectively second 27 hot track spiraling around a common spiral axis Z, which is normal to the upper face.

The first, respectively the second hot track comprise several coils, the inner coil of each of the first and second hot track encircling a central zone 30 defined on the upper face. In a variant which is not represented, the electroacoustic device can comprise more than 2, notably 4 hot electrodes, all comprising hot tracks spiraling around the spiral axis Z.

As it can be observed on FIGS. 2 and 4, the first and second hot tracks spiral are such that the radial step Δr between two adjacent coils of the first, respectively second hot tracks decreases from the center. For instance, the radial step between the radially inner adjacent coils and the radially outer adjacent coils decreases from 136 to 115 μm.

The electroacoustic device comprises a ground electrode 35, which as for the embodiment illustrated on FIGS. 1 to 4, consists in a ground coating 36 extending partially over the lower face 37 opposite to the upper face. The first and second electrodes, the ground electrode and the piezoelectric part define a wave transducer 41. The ground electrode is electrically connected to the ground 40. As illustrated on FIG. 3, where the hot electrodes provided on the upper faces are drawn as dashed patterns, the ground coating entirely cover the first and second hot track. The first track and the ground coating on the one hand, and the second track and ground coating on the other hand define first 42 and second 44 electrode pairs which when electrically powered generates respectively first $W_1$ and second $W_2$ volume ultrasonic waves that deform the piezoelectric part. In particular, the control unit is adapted for delivering electrical power to the first and second electrodes such that the phase shift between first and second volume ultrasonic wave is equal to $\pi$.

Furthermore, as illustrated in FIG. 5, the body 10 is provided on top of the upper face 20, such that the first 15 and second 17 hot electrodes are sandwiched in between the piezoelectric part 7 and the body.

The electroacoustic device comprises a base provided on the face opposite to the one facing the wave transducer. The base is a plate made of borosilicate glass of thickness $e_a$ of 150 μm. The base can be moved in at least two directions transverse to the spiral Z. An interface liquid of thickness less than 10 μm is provided between the base and the body.

A sound absorber 50 made for instance of PDMS is provided on the base, which defines a cavity 55 containing a fluid medium 58, preferably a liquid medium. An object 60 is embedded in the fluid medium.

When powering the hot electrodes, the wave transducer is deformed by the first $W_1$ and second $W_2$ volume ultrasonic waves propagating substantially along a direction parallel to the spiral axis, in the piezoelectric part.

The wave transducer transmits said volume ultrasonic waves to the bulk of the body wherein they define a focalized ultrasonic vortex FV which focal locus (wherein the acoustic intensity is the lowest) is located in the cavity. By displacing the base relatively to the body, the object can be brought close to the focal locus. It can then be manipulated and notably be entrapped along the spiral axis.

The electroacoustic device illustrated in FIG. 6 differs from the one illustrated on FIG. 1 by a recess 65 formed in the piezoelectric part, provided radially between the first 15 and second 17 hot electrodes, and consisting in a groove spiraling around axis Z. The spiraling groove comprises at least one coil, in the present case, 4 coils. As illustrated the radial width $\Delta_c$ of a coil of the groove can decrease from the spiral axis Z. In a variant, it can be constant. The recess limits the propagation of a diaphonic transverse volume or surface acoustic wave in the substrate.

The electroacoustic device illustrated on FIGS. 7 and 8 differs from the one illustrated on FIG. 1 by the fact the ground electrode comprises two first 70 and second 75 ground tracks instead of the ground coating, and both connected to the ground 40.

The ground tracks are provided on the lower face 37 of the piezoelectric part opposite to the one on which the first and second hot electrodes are provided.

The first, respectively the second ground track is completely superimposed on the first, respectively the second hot track, and vice versa. They define first 42 and second 44 electrode pairs.

The electroacoustic device illustrated on FIG. 9 differs from the one illustrated on FIG. 8 by the following features.

On the upper face, instead of the second hot electrode of the device of FIG. 1, a ground track 78 is provided, which has a shape and position relative to the spiral Z which are identical to the second hot electrode of the device of FIG. 8.

On the lower face, instead of the second ground electrode of the device of FIG. 1, a hot track 79 is provided, which has a shape and position relative to the spiral Z which are identical to the second hot electrode of the device of FIG. 8.

FIGS. 10 and 11 illustrate a second embodiment of the invention. The electroacoustic device according to the second embodiment differs from the embodiment illustrated on FIG. 1 by the fact it comprises a body 10 consisting of a piezoelectric part 7 made of LiNbO$_3$ Y-cut having a thickness 150 microns, having an upper face and a lower face opposite to the upper face, and by the fact a ground electrode 80 and a hot electrode 85 are provided on the same face of the body, in the present case on the lower face. They comprise respective ground and hot tracks spiraling around a spiral axis Z.

The hot and ground spiraling tracks define an intertwined pattern of coils of the respective track on the face where they are disposed.

Furthermore, the electroacoustic device comprises a base provided on the face opposite to the one facing the wave transducer. The base is a plate made of borosilicate glass of thickness $e_a$ of 150 μm. The base can be moved in at least two directions transverse to the spiral axis Z. An interface gel of thickness less than 10 μm is provided between the base and the body.

A sound absorber 50 made for instance of PDMS is provided on the base, which defines a cavity 55 containing a fluid medium 58, preferably a liquid. An object 60 is embedded in the fluid medium.

The hot and ground tracks are conformed such that the local deformation of the piezoelectric part in between two adjacent coils they induce, when the hot track is electrically powered by mean of the control unit, interfere to define a focalized ultrasonic vortex propagating in the body and focusing in the cavity containing the fluid medium. By displacing the base relatively to the body, the object can be manipulated.

FIG. 12 illustrates the location of a Cartesian coordinate system for defining a spherical vortex such as for instance defined by equation (x), which focal locus is referred by point 2 and intercepts the plane, referred by n=0, on which the electrodes are provided, for instance being the face 20 of the piezoelectric part.

FIG. 13 aims at illustrating the resolution of equations (i) to (vii), in the case the vortex FV propagates in the body being the piezoelectric part from the hot track towards the focal locus 2 over a distance $z^{(N)}$ along axis Z. The vortex FV comprises 3D lines along which the phase is constant, named equi-phase lines. For instance, along an equi-phase line 99, the phase of the vortex is the same at points 100a to 100c. The projection, along the line 117 that joins the focal locus 2 and points 100a to 100c, of equi-phase line 99 is a plane line which is set by parameter R(θ) expressed from the center C on the surface where the tracks are provided. In other words, the intersection of the phase of the focalized ultrasonic vortex onto the plane where the hot track has to be provided yields the drawing of the hot track. This is for instance mathematically expressed by the set of equations (i) to (viii). By forming at least one hot track drawing said line R(θ), an ultrasonic vortex focalizing at focal point 2 can be generated. The example of FIG. 13 corresponds to a specific case of the resolution of the set of equations (i) to (viii), wherein the electroacoustic device comprise a single body being the piezoelectric part. It will appear clearly to the skilled worker that the method illustrated here above can be applied to any other variant of the invention, for instance in case the electroacoustic device comprises a piezoelectric part, a body different from the piezoelectric part, and optionally other substrate(s) provided on top of the body.

FIG. 14 illustrates another embodiment of the electroacoustic device 5 according to the invention. The electroacoustic device 5 has the general shape of a pen 128 which can be grasped by a user. It comprises a support 130 extending along an extension axis and to which a wave transducer 41 is attached. The wave transducer is provided at an extremity of the support. The wave transducer comprises a body 10 consisting in a piezoelectric part 7. First 15 and second 17 hot electrodes are provided on a face of the body and a ground electrode 36 is provided on the other part of the body in a fashion as already illustrated in FIG. 4. The electroacoustic device further comprises a quarter wavelength layer 135 provided on top of the face where the first and second hot electrodes are provided and on top of said hot electrodes. The quarter wavelength filter is made of an electrically isolating material to prevent any electric shunt as it will appear here below. In a variant, the ground electrode and the first and second hot electrodes can all be provided respectively on the face of the piezoelectric part which faces the support.

The electroacoustic device can be used for manipulating an object in the following manner.

A container 110 comprising an opening 111 and defining a cavity 112 is filled with a fluid medium 120, preferably a liquid medium, in which an object 122 is embedded. The electroacoustic device is handled by a user such that the wave transducer is immersed in the liquid.

When an electrical voltage is applied to the electroacoustic device by means of a power generator, not represented, first $W_1$ and second $W_2$ volume ultrasonic waves are generated that deform the piezoelectric part. The wave transducer transmits said volume ultrasonic waves $W_1$ and $W_2$ directly in the fluid medium wherein they define a focalized ultrasonic vortex FV which focal locus, i.e. wherein the acoustic intensity is the lowest, is located in the cavity. By displacing the electroacoustic device 5 relatively to the container 110, the object 122 can be brought close to the focal locus. It can then be manipulated in 3D.

FIG. 15 illustrates another embodiment of an electroacoustic device 5 according to the present invention.

The electroacoustic device of FIG. 15 differs from the electroacoustic device of FIG. 1 in that it comprises a single hot electrode 125 and that the ground electrode 130 is arranged with the hot electrode on the same face of the piezoelectric part 7. In the present case, they are provided on the upper face 20 of the piezoelectric part.

The ground electrode and the hot electrode each comprise a contact brush 135a-b to be connected to a control unit 140. The control unit provides different electrical potential to the ground electrode and to the hot electrode. The ground electrode is for example connected to a ground socket of the control unit, which electrical potential is defined as a reference, as being grounded 40.

In particular, the electrical potentials of the hot electrode of the ground electrode can be out of phase the one with respect to the other by a phase equal to π.

The hot electrode and the ground electrode comprise a hot track 145 and a ground track 150 respectively, which spiral around a common axis Z, normal to the upper face. The hot track, respectively the ground track, comprises several coils, the inner coil of each encircling a central zone 230 defined on the upper face.

Furthermore, the hot track and the ground track are intertwined the other with the other.

As it can be observed on FIG. 16, the ground track and the hot track are such that the radial step Δr' between two adjacent coils 240a-b of the ground track, respectively the hot track decreases radially from the center.

When the control unit provides an electrical power to the hot electrode, the ground electrode and the hot electrodes generate volume ultrasonic waves that deform the piezoelectric part. The ultrasonic waves can be transmitted to the bulk of the body to define a focalized ultrasonic vortex in the manner depicted in FIG. 5.

As it appears throughout the present description, the electroacoustic device according to the invention improves the efficiency of manipulating an object embedded in a fluid medium. It further improves the selectivity, when manipulating a specific object among a population of objects.

Of course, the invention is not limited to the specific embodiments detailed in the present description.

The invention claimed is:

1. Electroacoustic device comprising a body, an electrode to be electrically powered, named hot electrode, and an electrode to be electrically grounded, named ground electrode,
    the body comprising a piezoelectric part or the electroacoustic device further comprising a piezoelectric part different from the body,
    the hot electrode comprising a hot track spiraling around a spiral axis, the radial step between two consecutive coils of the hot track decreasing radially from the spiral axis,
    the hot electrode and the ground electrode being arranged on the piezoelectric part such as to define a wave transducer configured to generate a focalised ultrasonic vortex propagating in the body and/or, when a fluid medium is acoustically coupled with the electroacoustic device, in said fluid medium.

2. Electroacoustic device according to claim 1, wherein the wave transducer is configured for the body to be located in between the hot electrode and a focal locus of the focalised ultrasonic vortex.

3. Electroacoustic device according to claim 1, wherein the ground electrode is provided on the face of the piezoelectric part wherein the hot track is provided.

4. Electroacoustic device according to claim 3, wherein the ground track is provided on the face of the piezoelectric part opposite to the face wherein the hot track is provided.

5. Electroacoustic device according to claim 1, wherein the piezoelectric part is different from the body, the body being arranged on a face of the wave transducer and is acoustically coupled with the wave transducer.

6. Electroacoustic device according to claim 1, wherein the ground electrode comprises at least one ground track spiraling around the spiral axis.

7. Electroacoustic device according to claim 1, comprising a plurality of at least N hot electrodes, with N being at least 2 and at least one electrode of the plurality comprising a hot track spiraling around the spiral axis.

8. Electroacoustic device according to claim 7, wherein the ground track is provided between two adjacent hot tracks.

9. Electroacoustic device according to claim 7, wherein the ground electrode comprises at least M ground tracks, with M being at least 2, each ground track defining at least one spiral coil, the radial step between two adjacent coils of two adjacent ground tracks decreasing from the spiral axis.

10. Electroacoustic device according to claim 7, further comprising a control unit for electrically powering the hot electrodes and being configured for controlling each electrode pair consisting of a hot electrode and the ground electrode, such that said each pair generates a volume acoustic wave in the piezoelectric part, the phase shift between the volume acoustic waves generated by two adjacent electrodes pairs being of $2\pi/N$.

11. Electroacoustic device according to claim 7, wherein at least two hot electrodes each comprise a single hot track defining at least one spiral coil, the step distance between two adjacent coils of the two respective adjacent hot tracks decreasing from the spiral axis.

12. Electroacoustic device according to claim 7, wherein two adjacent hot tracks are provided on the same face of the piezoelectric part or two adjacent hot tracks are provided on two opposite faces of the piezoelectric part.

13. Electroacoustic device according to claim 7, wherein the ground electrode comprises a ground coating extending over a face of the piezoelectric part and superimposed with the hot track of each hot electrode of the plurality of N hot electrodes.

14. Electroacoustic device according to claim 13, wherein the ground electrode is superimposed with at least two adjacent hot tracks of two adjacent electrodes of the plurality of hot electrodes, said adjacent hot tracks being provided on the same face of the piezoelectric part, and with a gap separating said two adjacent hot tracks.

15. Electroacoustic device according to claim 7, wherein each ground track is completely superimposed with the hot track of a respective hot electrode of the plurality of hot electrodes, and vice-versa.

16. Electroacoustic device according to claim 7, wherein the piezoelectric part is provided in between the gap between the hot tracks of two adjacent hot electrodes.

17. Electroacoustic device according to claim 1, wherein the body comprises in the piezoelectric part, the hot electrode and the ground electrode comprising respective hot track and ground track provided on a same face of the body, both the hot track and ground track spiraling around the spiral axis Z.

18. Electroacoustic device according to claim 1 wherein the hot track draws a line along a polar coordinate $R(\theta)$, from a center C, said polar coordinate being obtained by solving equation (i)

$$\psi_0 = \mu^{(N)}(\overline{\psi} + \pi, -\overline{\sigma}_N) - \alpha(\overline{\psi} + \pi, -\overline{\sigma}_N) + \omega s_{ref} h(\theta, \varphi, \overline{\psi}, \overline{\sigma}_N)\sqrt{R^2 + z^{(N)^2}} + \frac{\pi}{4}\zeta \quad \text{(i)}$$

wherein $$\tan \varphi = -\frac{R}{z^{(N)}}, \quad \text{(ii)}$$

with z(N) being the distance along axis Z between the face of the piezoelectric part on which the hot track is provided and the focal locus 2 of the vortex $\psi_0^{(R)}$ is the phase of the electric potential coupled to the vortex by piezoelectric effect at height along axis Z on the plane where the hot track is provided, the equation (i) being solved when this phase is constant along an electrode, $\mu^{(N)}(\overline{\psi}+\pi,-\overline{\sigma}_N)$ is the phase of the angular spectrum at the focal locus of the vortex with $\psi$ and $\overline{\sigma}_N$ being beam stirring angles, preferably $\mu^{(N)}=-m\overline{\psi}$ with m being a positive integer number, $\alpha(\overline{\psi}+\pi,-\overline{\sigma}_N)$ is the piezoelectric coupling coefficient, $\omega$ is the wave pulsation of the vortex, $S_{ref}$ is a reference speed, $h(\theta,\varphi,\psi,\sigma_N)$ is the dimensionless fly time of the wave, which reads $$h = \frac{1}{s_{ref}}\left(s_r(\psi, \sigma_0(\sigma_N))\sin\varphi \cos(\psi - \theta) + \cos\varphi \sum_{n=0}^{N-1} s_z^{(n)}(\psi, \sigma_n(\sigma_N))\gamma_n^{n+1}\right) \quad \text{(iii)}$$

where $$\gamma_n^{n+1} = \frac{z^{(n+1)} - z^{(n)}}{z^{(N)}},$$

with $Z^{(N)}$ being the distance between the first interface of a material n stacked onto the piezoelectric part and the plane containing the hot track, in case n medium are stacked onto the piezoelectric part, n=0 corresponding to the plane containing the hot track, $s_r(\psi,\sigma_0(\sigma_N))$ and $s_z^{(n)}(\psi,\sigma_n(\sigma_N))$ components of the wave slowness vector in the cylindrical coordinate system with the propagation direction being referred by angles $\psi$ and $\sigma$; $s_r(\psi,\sigma_0(\sigma_N))$ is independent of the material due to propagation laws, and is for instance chosen as being equal to $s_r^{(0)}(\psi,\sigma_0(\sigma_N))$ which is the radial component of the wave slowness in the piezoelectric part; each wave, which forms the vortex by interference of multiples waves, propagates in medium n along a direction expressed with angles $\psi$ and $\sigma_n$ being the azimuthal and inclination angles respectively from axis Z measured from the focal locus of the vortex, and $\sigma^0$ being the refraction angle of the material constitutive of the piezoelectric part; angle $\psi$ is independent from the material wherein the wave propagates while the refraction angle $\sigma_n$ is obtained by solving the Snell-Descartes relationship $$s^{(n)}(\psi,\sigma_n)\sin\sigma_n = s^{(N)}(\psi,\sigma_N)\sin\sigma_N, \quad \text{(iv);}$$

a man skilled in the art knows how to compute the slownesses from the material's properties for any kind of wave using solid acoustics methods well known in the art;

$S_Z^{(n)}$ is given by the following dispersion relationship $$s_z^{(n)}(\psi,\sigma_n) = \sqrt{s^{(n)}(\psi,\sigma_n)^2 - s_r(\psi,\sigma_0(\sigma_N))^2} \quad \text{(v), and}$$

$$\frac{\pi}{4}\zeta$$

is the Gouy phase of the vortex, wherein $\zeta$ is the signature, i.e. the difference between the number of positive eigenvalues and the number of negative eigenvalues of the Hessian matrix A of function h evaluated at $\overline{\psi}, \overline{\sigma}_N$ $$A = \begin{pmatrix} \frac{1}{\sin^2\sigma_N}\frac{\partial^2}{\partial\psi^2}h & \frac{1}{\sin\sigma_N}\frac{\partial^2}{\partial\psi\partial\sigma}h \\ \frac{1}{\sin\sigma_N}\frac{\partial^2}{\partial\psi\partial\sigma}h & \frac{\partial^2}{\partial\sigma^2}h \end{pmatrix}\Bigg|_{\overline{\psi},\overline{\sigma}_N} \quad \text{(vi)}$$

To solve equation (i), once the 4 variable function $h(\theta,\varphi,\psi,\sigma_N)$ is obtained, the beam stirring angles $\overline{\psi}, \overline{\sigma}_N$ are obtained, using numerical well known methods, as solutions of the following differential equation systems $$\begin{cases} \frac{\partial}{\partial\sigma_N}h = 0, \\ \frac{1}{\sin\sigma_N}\frac{\partial}{\partial\psi}h = 0. \end{cases} \quad \text{(vii)}$$

19. Electroacoustic device according claim 1, wherein the stack consists of a piezoelectric part and a body, the body being thicker than the piezoelectric part, and made of a an isotropic material, and the hot track draws a line along a polar coordinate $R(\theta)$, from a center C which equation is $$R(\theta) = \sqrt{\left(\frac{\psi_0 + m\theta}{\omega s}\right)^2 - z^{(N)2}} \quad \text{(viii)}$$

with m being an integer, s being the slowness of the vortex in the body, $\psi_0$ being a constant, $\omega$ being the pulsation of the vortex, and $z^{(N)}$ being the distance along axis Z between the face of the piezoelectric part on which the hot track is provided and the focal locus of the vortex.

20. Electroacoustic device according to claim 1, wherein the width of the hot track radially varies from the center.

21. Electroacoustic device according to claim 1, comprising a support to which the wave transducer is attached, the support comprising a handle adapted to be gripped by a hand of a user or by a robotic arm, or comprising a stage and a base, the stage being adapted to move along at least one directions relative to the base.

22. Electroacoustic device according to claim 21, the electroacoustic device being in the form of a pen or the displacement of the stage being actuated by means of a motor or manually.

23. Method for manipulating a fluid medium or at least one object being embedded in the fluid medium, the method comprising the successive steps consisting in:

generating a focalised ultrasonic vortex with the electroacoustic device according to claim 1, positioning the fluid medium such that the focal locus of the focalised ultrasonic vortex is provided in the bulk of the liquid medium, such as to generate an acoustic trap or an acoustic streaming to which the fluid medium and/or the object are submitted.

24. Method according to claim 23, comprising, manipulating the object through displacement of the wave transducer of the electroacoustic device relative to the fluid medium or manipulating the fluid by means of acoustic streaming.

* * * * *